United States Patent
Cayson et al.

(10) Patent No.: US 12,533,934 B2
(45) Date of Patent: Jan. 27, 2026

(54) OMNI TRUCK BED COVER SYSTEM

(71) Applicant: Omni Truck Covers LLC, Cypress, TX (US)

(72) Inventors: Andrew James Cayson, Cypress, TX (US); Brittany Claire Vogt, Cypress, TX (US)

(73) Assignee: Omni Truck Covers LLC, Cypress, TX (US)

( * ) Notice: Subject to any disclaimer, the term of this patent is extended or adjusted under 35 U.S.C. 154(b) by 385 days.

(21) Appl. No.: 18/229,578

(22) Filed: Aug. 2, 2023

(65) Prior Publication Data
US 2024/0042840 A1    Feb. 8, 2024

Related U.S. Application Data

(60) Provisional application No. 63/394,863, filed on Aug. 3, 2022.

(51) Int. Cl.
  B60J 7/16    (2006.01)
  B60J 7/19    (2006.01)

(52) U.S. Cl.
  CPC .............. B60J 7/1621 (2013.01); B60J 7/198 (2013.01)

(58) Field of Classification Search
  CPC ......... B60J 7/1607; B60J 7/1621; B60J 7/198
  USPC ........................... 296/100.07, 100.08, 100.17
  See application file for complete search history.

(56) References Cited

U.S. PATENT DOCUMENTS

| | | | | |
|---|---|---|---|---|
| 3,420,570 | A | 1/1969 | Kunz | |
| 4,284,303 | A * | 8/1981 | Hather | B62D 33/08 16/261 |
| 4,629,243 | A * | 12/1986 | Jensen | B60P 3/32 16/229 |
| 5,595,418 | A * | 1/1997 | Medlin | B60J 7/1621 296/100.1 |
| 6,227,602 | B1 * | 5/2001 | Bogard | B60J 7/1621 296/100.09 |
| 6,394,532 | B1 * | 5/2002 | Dence | B60P 3/34 296/100.06 |
| 6,505,875 | B1 * | 1/2003 | Laper | B60J 7/1621 296/100.06 |
| 6,755,456 | B2 * | 6/2004 | Addicott | B60J 7/11 296/100.06 |
| 6,929,303 | B1 * | 8/2005 | Sharples | B60P 3/0255 296/100.1 |

(Continued)

*Primary Examiner* — Jason S Morrow
(74) *Attorney, Agent, or Firm* — C. Tumey Law Group PLLC

(57) ABSTRACT

A truck bed cover system includes a rail system configured to mount to a truck bed. The rail system has a front rail, a left rail secured to a left end of the front rail, and a right rail secured to a right end of the front rail. The truck bed cover system also includes a plurality of hinges secured to the rail system with at least two hinges of the plurality of hinges secured to each of the front rail, the left rail, and the right rail. Further, the truck bed cover system includes a plurality of rotary latches secured to corresponding hinges of the plurality of hinges and a cover portion secured to each rotary latch. The truck bed cover system further includes an actuation assembly having respective actuators configured to detach selected rotary latches such that the cover hinges from either the left rail, the right rail, or the front rail.

20 Claims, 10 Drawing Sheets

(56) References Cited

U.S. PATENT DOCUMENTS

| | | | | |
|---|---|---|---|---|
| 7,275,779 | B2* | 10/2007 | Hebron | B60J 7/1621 |
| | | | | 296/100.1 |
| 7,422,265 | B1* | 9/2008 | Liao | B60J 7/1621 |
| | | | | 296/100.1 |
| 8,398,137 | B2* | 3/2013 | Castillo | B60P 7/10 |
| | | | | 296/183.1 |
| 9,186,970 | B1* | 11/2015 | Marsh | B60J 7/1621 |
| 10,562,384 | B2 | 2/2020 | Rohr et al. | |
| 10,994,647 | B1* | 5/2021 | Dence | B60P 3/34 |
| 11,358,453 | B2* | 6/2022 | Sinchok | B60J 7/141 |
| 11,465,477 | B2* | 10/2022 | Hawkins | B60J 7/1607 |
| 2008/0116711 | A1* | 5/2008 | Thacker | B60J 7/1614 |
| | | | | 296/107.07 |
| 2023/0339551 | A1* | 10/2023 | Gongloff | B60J 7/1621 |

\* cited by examiner

OMNI TRUCK BED COVER SYSTEM

CROSS-REFERENCE TO RELATED APPLICATIONS

The present application is a non-provisional conversion of Provisional U.S. Patent Application No. 63/394,863, filed Aug. 3, 2022, the entire disclosure of which is incorporated herein by reference.

BACKGROUND

Truck bed covers or tonneau covers are generally used to convert an open truck bed into a protected storage space and/or to improve aerodynamics of the vehicle. Hard truck bed covers generally have a hinging mechanism or a folding mechanism to open the truck bed cover and provide access to the truck bed. However, access to the truck bed may be limited near the hinging mechanism. Further, these truck bed covers generally include a handle positioned proximate the tailgate of the truck bed for opening the truck bed cover. In certain situations, this handle may be inconvenient to access. A new truck bed cover is needed to provide improved access to truck beds, as well as more convenient systems for opening or retracting truck bed covers.

BRIEF DESCRIPTION OF THE DRAWINGS

These drawings illustrate certain aspects of some of the embodiments of the present disclosure and should not be used to limit or define the method.

DETAILED DESCRIPTION

Disclosed herein is a truck bed cover system configured to open from multiple sides of a truck bed to improve access to the truck bed, as well as to improve convenience for users. Specifically, the truck bed cover system may include a plurality of actuators (e.g., handles) positioned at various locations about the truck bed cover system such that a user may open the truck bed cover system from any side of the truck bed having an actuator. For example, the user may open the truck bed cover system via a left handle on a left side of the truck bed cover system (e.g., driver's side), a right handle on a right side of the truck bed cover system (e.g., passenger's side), a rear handle on a rear side of the truck bed cover system (e.g., proximate the tailgate), etc. Being able to open the truck bed cover system from any side of the truck bed improves access to the truck bed, as well as improves convenience for users.

Figure 1:
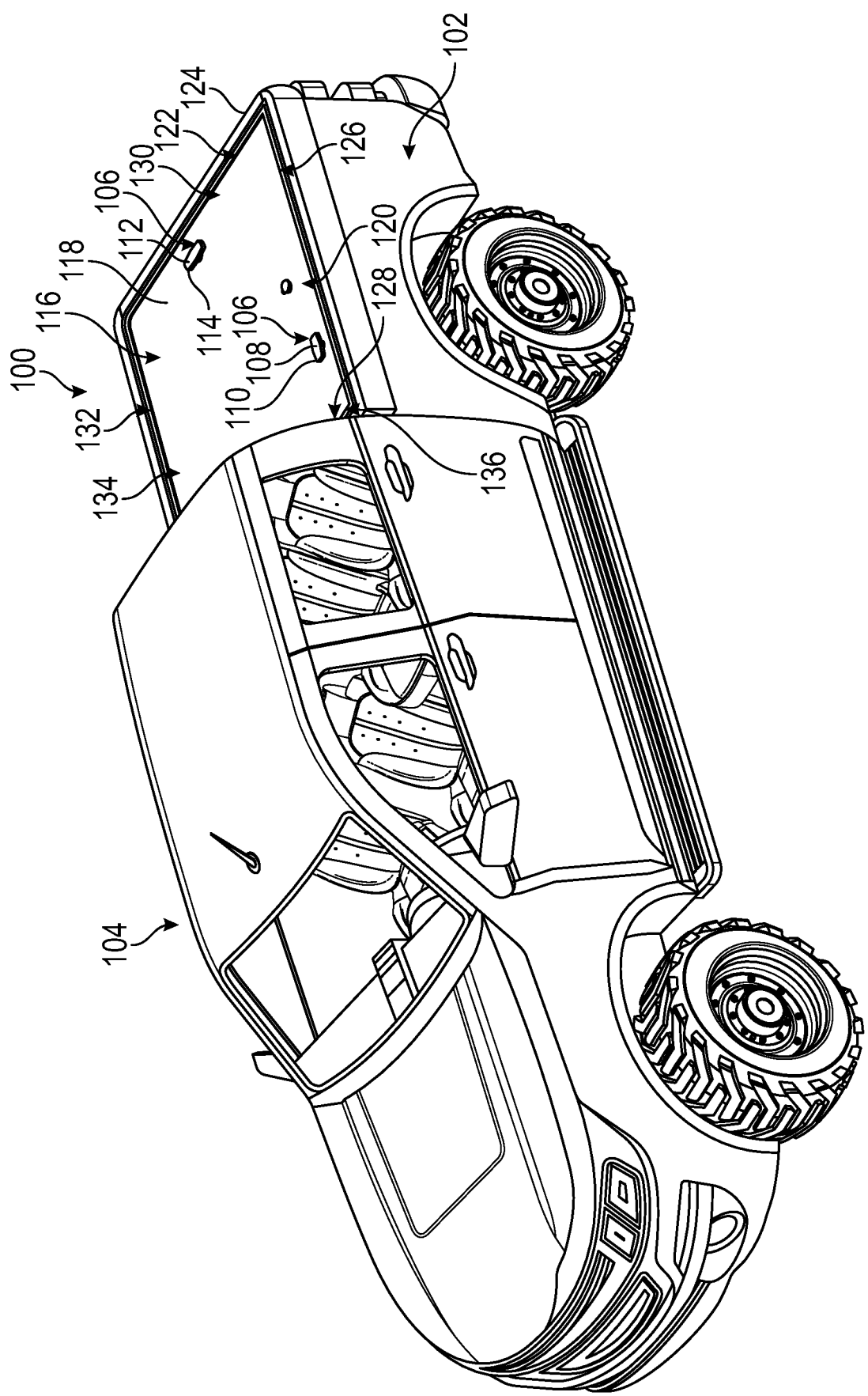
FIG. 1 illustrates an orthogonal view of a vehicle having a truck bed cover system, in accordance with some embodiments of the present disclosure.

FIG. 1 illustrates an orthogonal view of a vehicle having an omni truck bed cover system, in accordance with some embodiments of the present disclosure. As illustrated, the truck bed cover system 100 may be secured over a truck bed 102 of a vehicle 104 (e.g., a truck) to isolate the truck bed 102 (e.g., cargo bed) from environmental conditions. For example, the truck bed cover system 100 may protect the truck bed 102 from rain, dirt, snow, etc. Additionally, the truck bed cover system 100 may be used to securely store cargo within the truck bed 102.

The truck bed cover system 100 includes at least two actuators 106 for opening a cover portion 116 of the truck bed cover system 100. For example, the truck bed cover system 100 may include a left actuator 108 (e.g., left handle 110) and a rear actuator 112 (e.g., rear handle 114) for opening the cover portion 116. As illustrated, the left handle 110 and the rear handle 114 may be mounted to a top surface 118 of the cover portion 116. However, the left handle 110 and the rear handle 114 may be mounted to any suitable portion of the truck bed cover system 100. Further, the left actuator 108 may be positioned on a driver's side 120 of the truck bed 102 and the rear actuator 112 may be positioned proximate a rear end 122 of the truck bed 102 (e.g., near a tailgate 124 of the truck).

As set forth in greater detail below, actuating the left handle 110 may detach/decouple a left side 126, a front side 128, and/or the rear side 130 of the cover portion 116 of the truck bed cover system 100 such that the cover portion 116 may hinge open about a right side 132 of the truck bed cover system 100. Further, actuating the rear handle 114 may detach the rear side 130, the left side 126, and/or a right side 134 of the cover portion 116 of the truck bed cover system 100 such that the cover portion 116 may hinge open about a front side 136 of the truck bed cover system 100. As such, each actuator 106 may provide unique access to the truck bed 102. Additional actuators 106 may be incorporated to provide additional access to the truck bed 102.

Moreover, the at least two actuators 106 may be actuated by rotation of the at least two actuators 106 in either the clockwise or counterclockwise direction from a neutral state of the respective actuators 106. For example, rotating the left handle 110 in the clockwise or counterclockwise direction from a neutral state of the left handle 110 may detach/decouple the left side 126, the front side 128, and/or the rear side 130 of the cover portion 116 of the truck bed cover system 100 such that the cover portion 116 may hinge open about the right side 132 of the truck bed cover system 100. Additionally, after rotating the left handle 110 to detach/decouple the left side 126, the front side 128, and/or the rear side 130 of the cover portion 116, the left handle 110 may be used as a grip by a user to pull the cover portion 116 upward from a close position toward an open position.

Figure 2:
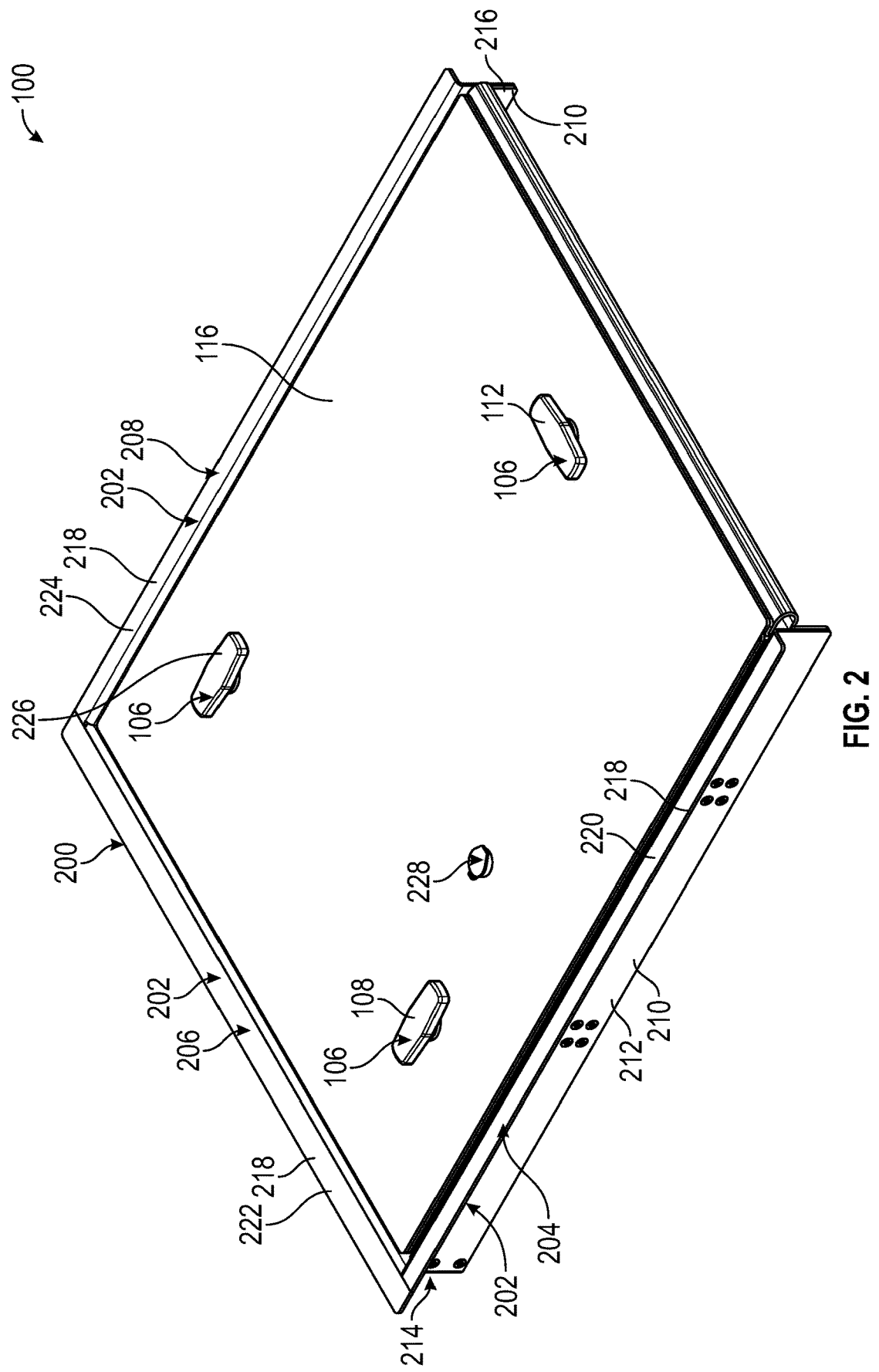
FIG. 2 illustrates an orthogonal view of an omni truck bed cover system with a rail system, in accordance with some embodiments of the present disclosure.

FIG. 2 illustrates an orthogonal view of an omni truck bed cover system with a rail system, in accordance with some embodiments of the present disclosure. As illustrated, the truck bed cover system 100 comprises a rail system 200 configured to attach to the truck bed 102 of the vehicle 104 (shown in FIG. 1). In particular, the rail system 200 may include a plurality of rails 202 (e.g., a left rail 204, a front rail 206, and a right rail 208). Each of the rails 202 (e.g., the left rail 204, the front rail 206, and the right rail 208) may have a base portion 210 (e.g., a left base portion 212, a front base portion 214, and a right base portion 216) as well as a support portion 218 (e.g., a left support portion 220, a front support portion 222, and a right support portion 224) extending laterally outward from the respective base portions 210. The rail system 200 may interface with the truck bed 102 via the support portions 218. That is, respective bottom surfaces of the support portions 218 may contact respective top edges (shown in FIG. 1) of the truck bed 102 such that the support portions 218 may rest on the respective edges of the truck bed 102. The base portions 210 may extend partially down into the truck bed 102. As such, the base portions may be positioned proximate to the upper inner surface of the truck bed 102. The base portions 210 may contact the upper inner surface of the truck bed 102. However, there may be a gap formed between the base portions 210 and the upper inner surface of the truck bed 102.

The truck bed cover system 100 also includes the cover portion 116. As set forth in greater detail below, the cover portion 116 may be supported by a plurality of hinges (shown in FIG. 4), which may be secured to the rail system 200. Alternatively, the plurality of hinges may be secured directly to the truck bed 102. Moreover, the cover portion 116 may include a rigid cover configured to span across the truck bed 102 to protect the truck bed 102 from rain, dirt, snow, etc. Indeed, the cover portion 116 may include a polyurea coating, a powder coating, a paint coating, an anodic oxide finish, or some combination thereof. Moreover, in a closed position, the cover portion 116 may be configured to seal against the rail system 200 and/or the truck bed 102 to minimize entry of the rain, dirt, snow, etc. into the truck bed 102.

Further, as set forth above, the truck bed cover system 100 includes the at least two actuators 106 (e.g., handles) secured to the cover portion 116. As illustrated, the at least two actuators 106 may include three actuators 106 (e.g., the left actuator 108, a right actuator 226, and the rear actuator 112) for opening the truck bed cover system 100. In the illustrated embodiment, the actuators 106 are rotatable handles. However, any suitable actuator 106 may be used. As set forth above, the left actuator 108 is secured to the cover portion 116 near the driver's side 120 of the truck bed 102 (shown in FIG. 1), the right actuator 226 is secured to the cover portion 116 near a passenger's side of the truck bed 102, and the rear actuator 112 is secured to the cover portion 116 proximate the rear end 122 of the truck bed 102 (e.g., near the tailgate 124 of the truck shown in FIG. 1). However, these actuators 106 may be secured at any suitable position on the cover portion 116.

Further, additional actuators 106 may be incorporated to provide additional access to the truck bed 102. For example, the truck bed cover system 100 may include a forward-left actuator and a rear-left actuator (not shown). Each of these actuators 106 may allow the user to open the truck bed cover system 100 from the driver's side 120 of the truck. If the user exits the cab of the truck, the user may opt to open the truck bed cover system 100 using the forward-left actuator since the forward-left actuator is position closer to the cab than the rear-left actuator. However, if the user approaches the vehicle 104 from the rear, but wants to open the truck bed cover system 100 from the driver's side 120 to retrieve an item stored on the driver's side 120 of the truck bed 102, the user may opt to open the truck bed cover system 100 using the rear-left actuator.

Additionally, the truck bed cover system 100 may include a locking mechanism 228 such that items may be securely stored in the truck bed 102. In a locked state of the locking mechanism 228, the locking mechanism 228 is configured to prevent all of the actuators 106 (e.g., the left actuator 108, the right actuator 226, and the rear actuator 112) from opening the cover portion 116 of the truck bed cover system 100. Further, in an open state of the locking mechanism 228, the locking mechanism 228 permits any of the actuators 106 to open the cover portion. In the illustrated embodiment, the locking mechanism 228 may be a keyed lock. However, the locking mechanism 228 may include any suitable locking mechanism or locking mechanism interface (e.g., keypad, touchscreen, radio receiver for remote keyless entry, etc.)

Figure 3A:
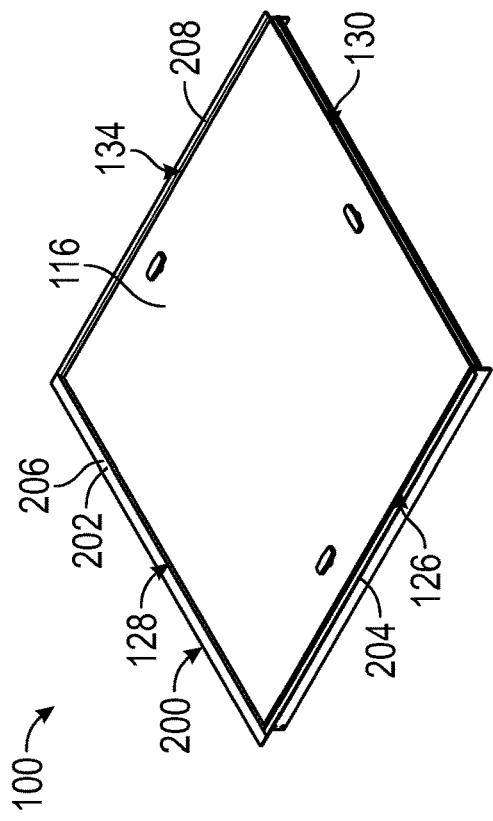
FIGS. 3A-3D illustrate orthogonal views of the omni truck bed cover system in a closed position, an opened from rear position, an opened from driver's side position, and an opened from passenger's side position, respectively, in accordance with some embodiments of the present disclosure.

FIGS. 3A-3D illustrate orthogonal views of the omni truck bed cover system in various positions, in accordance with some embodiments of the present disclosure. Referring to FIG. 3A, the truck bed cover system 100 is disposed in a closed position. That is, each side of the cover portion 116 (e.g., the left side 126, the front side 128, the right side 134, and the rear side 130) is in contact with or disposed proximate to respective rails 202 of the rail system 200 (e.g., the left rail 204, the front rail 206, and/or the right rail 208), respective edges of the truck bed 102 (shown in FIG. 1), and/or a top edge of the tailgate 124 (shown in FIG. 1). Further, as set forth above, in the closed position, the cover portion 116 may be configured to seal against the rail system 200 and/or the truck bed 102 to minimize entry of the rain, dirt, snow, etc. into the truck bed 102.

Figure 3B:
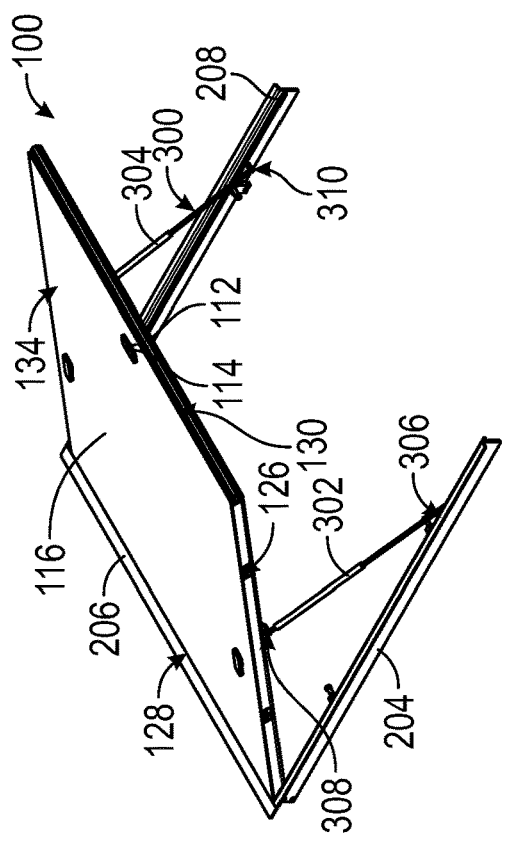

FIG. 3B illustrates the truck bed cover system in an opened-from-rear position. That is, the truck bed cover system 100 may be opened in a traditional manner with the cover portion hinging from the front rail 206 positioned adjacent to the front side 128 of the truck bed 102 and to the cab of the vehicle 104 (shown in FIG. 1). The truck bed 102 may be opened in this position via the rear actuator 112 (e.g., the rear handle 114) proximate the rear side 130 of the cover portion 116. Further, in the opened-from-rear position, the cover portion 116 may be supported via at least one support element 300 (e.g., compression spring, tension spring, torsion spring, etc.). For example, the at least one support element 300 may comprise a left gas spring 302 and a right gas spring 304. As illustrated, the left gas spring 302 may be secured to the left rail 204 at a proximal end 306 and the left side 126 of the cover portion 116 at a distal end 308. Further, the right gas spring 304 may be secured to the right rail 208 at a proximal end 310 and the right side 134 of the cover portion 116 at a distal end (not shown). The support elements 300 may exert sufficient force on the cover portion 116 to hold the cover portion 116 in the opened-from-rear position while still permitting external force (e.g., pushing or pulling by a user) to close the cover portion 116. Alternatively, the at least one support element 300 may include additional support elements 300. For example, the at least one support element 300 may include a first spring (e.g., the left gas spring 302), a second spring (e.g., the right gas spring 304), a third spring, and a fourth spring. The first spring 302 may be secured to the left rail 204 and the left side 126 of the cover portion 116 and the second spring 304 may be secured to the right rail 208 and the right side 134 of the cover portion 116. Further, the third spring and the fourth spring may each be secured to the front rail 206 and the front side 128 of the cover portion 116 (not shown). Indeed, the number of support elements 300 may be based at least in part on the strength of the support elements 300 (e.g., the springs) used and the weight of the cover portion 116.

Figure 3C:
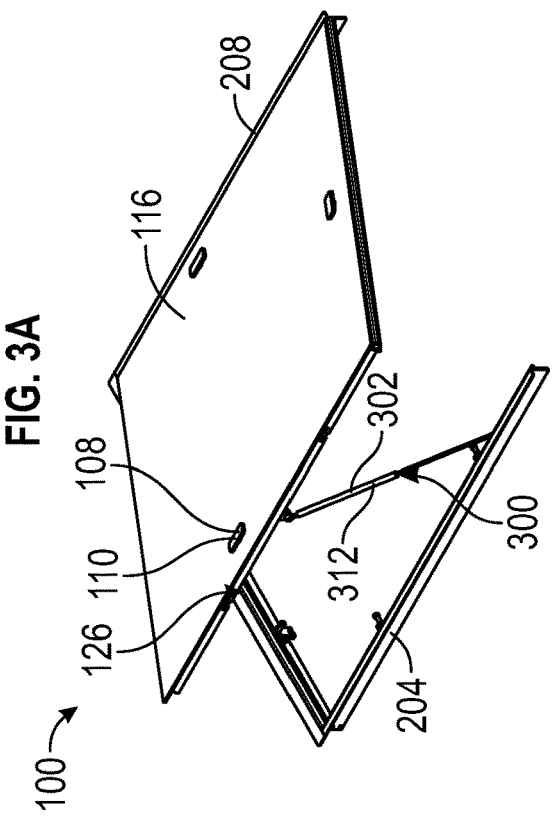

FIG. 3C illustrates the truck bed cover system in an opened-from-driver's-side position. That is, the truck bed cover system 100 may be opened from the driver's side (e.g., the left side 126) of the truck bed cover system 100 via the left actuator 108 (e.g., the left handle 110) disposed proximate the driver's side 120 of the truck bed 102 (shown in FIG. 1). As illustrated, the cover portion 116 may hinge from the right rail 208 in the opened-from-driver's-side position. Opening the cover portion 116 from the driver's side 120 may provide quick access to the truck bed 102 for the user (e.g., the driver of the vehicle). Further, the cover portion 116 may be supported (e.g., held open) in the opened-from-driver's-side position by a left support element 312 (e.g., the left gas spring 302) of the at least one support element 300. For example, the left gas spring 302 may support the cover portion in the opened-from-driver's-side position. As set forth above, the left gas spring 302 may be secured to the left rail 204 and the left side 126 of the cover portion 116.

Figure 3D:
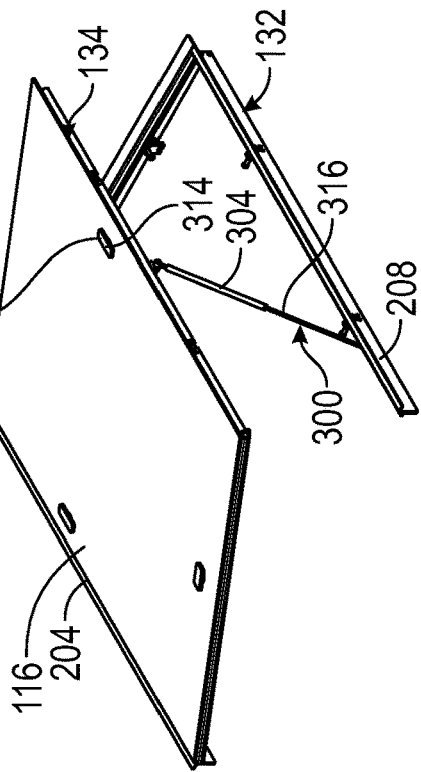

FIG. 3D illustrates the truck bed cover system 100 in an opened-from-passenger's-side position. The truck bed 102 may be opened from the right side 132 (e.g., the passenger's side) of the truck bed cover system 100 (shown in FIG. 1) via the right actuator 226 (e.g., a right handle 314) disposed on the right side 132 of the truck bed cover system 100. As illustrated, the cover portion 116 may hinge from the left rail 204 in the opened-from-passenger's-side position. Opening the truck bed 102 from the right side 132 may provide quick access to the truck bed 102 for a passenger of the vehicle. Further, the cover portion 116 may be supported (e.g., held open) in the opened-from-passenger's-side position by a right support element 316 (e.g., the right gas spring 304) of the at least one support element 300. For example, the right gas spring 304 may support the cover portion 116 in the opened-from-passenger's-side position. As set forth above, the right gas spring 304 may be secured to the right rail 208 and the right side 134 of the cover portion 116.

Figure 4:
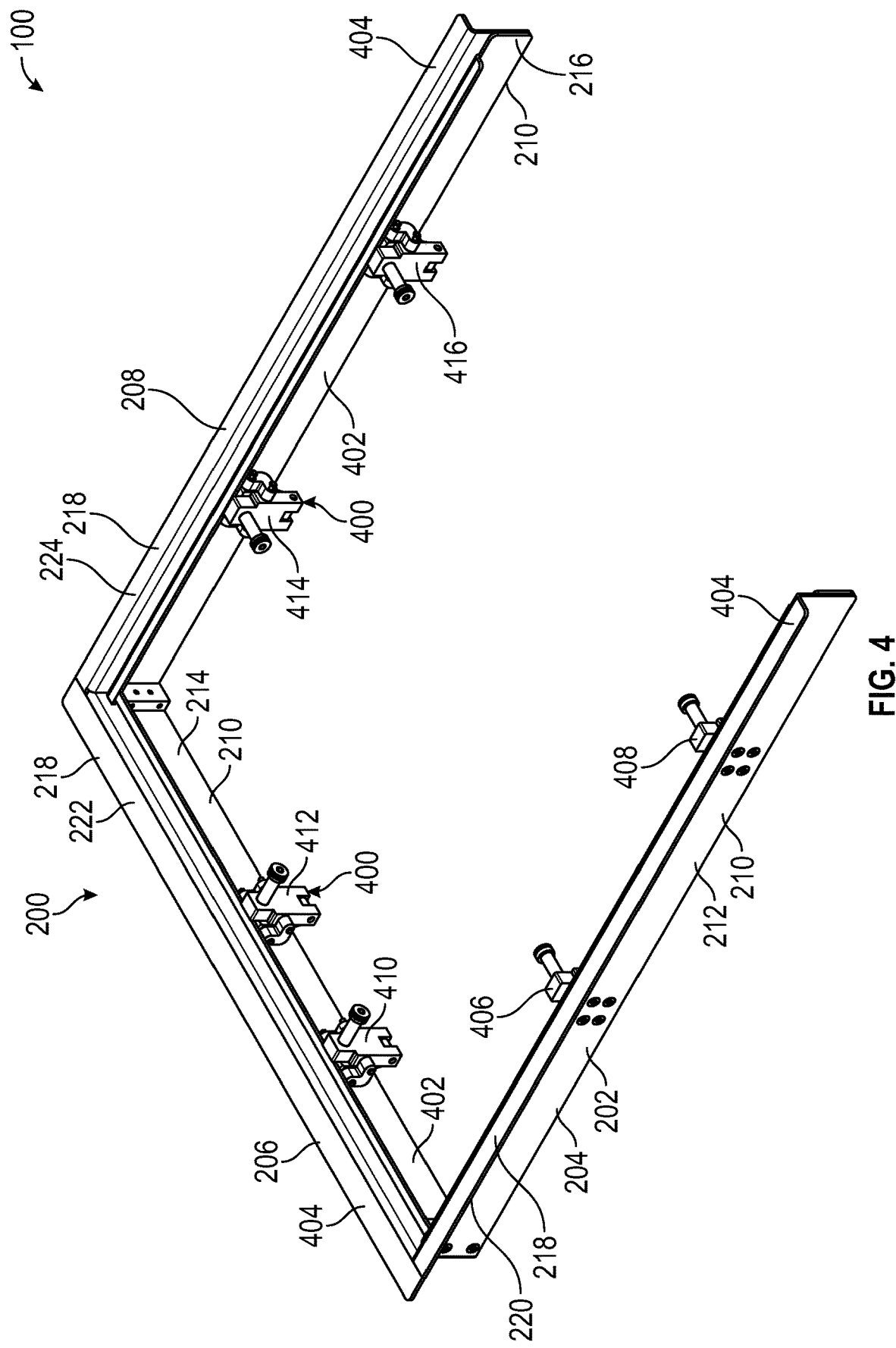
FIG. 4 illustrates a rail system for the truck bed system, in accordance with some embodiments of the present disclosure.

FIG. 4 illustrates a rail system for the truck bed system, in accordance with some embodiments of the present disclosure. As set forth above, the rail system 200 comprises the left rail 204, the front rail 206, and the right rail 208 with respective base portions 210 (e.g., the left base portion 212, the front base portion 214, and the right base portion 216) and support portions 218 (e.g., the left support portion 220, the front support portion 222, and the right support portion 224). Further, the truck bed cover system 100 includes the plurality of hinges 400 for supporting the cover portion 116 (shown in FIG. 2). As illustrated, the plurality of hinges 400 may be secured to the rail system 200. That is, the plurality of hinges 400 may be secured to respective inner surfaces 402 of their corresponding rails 202, to respective top surfaces 404 of the corresponding rails 202, or to both the inner surfaces 402 and the top surfaces 404 of the corresponding rails 202.

For example, as illustrated, the plurality of hinges 400 may include a forward-left hinge 406 and a rear-left hinge 408 each secured to the inner surface 402 of the left base portion 212, a front-left hinge 410 and a front-right hinge 412 secured to the inner surface 402 of the front base portion 214, and a forward-right hinge 414 and a rear-right hinge 416 secured to the inner surface 402 of the right base portion 216. Alternatively, the hinges 400 may be secured to both the respective base portions 210 and the respective support portions 218 of the rails 202 or may be secured to only the respective support portions 218. Further, the truck bed cover system 100 may include additional hinges 400. Moreover, as set forth above, the plurality of hinges 400 may alternatively be secured directly to the truck bed 102.

Figure 5B:
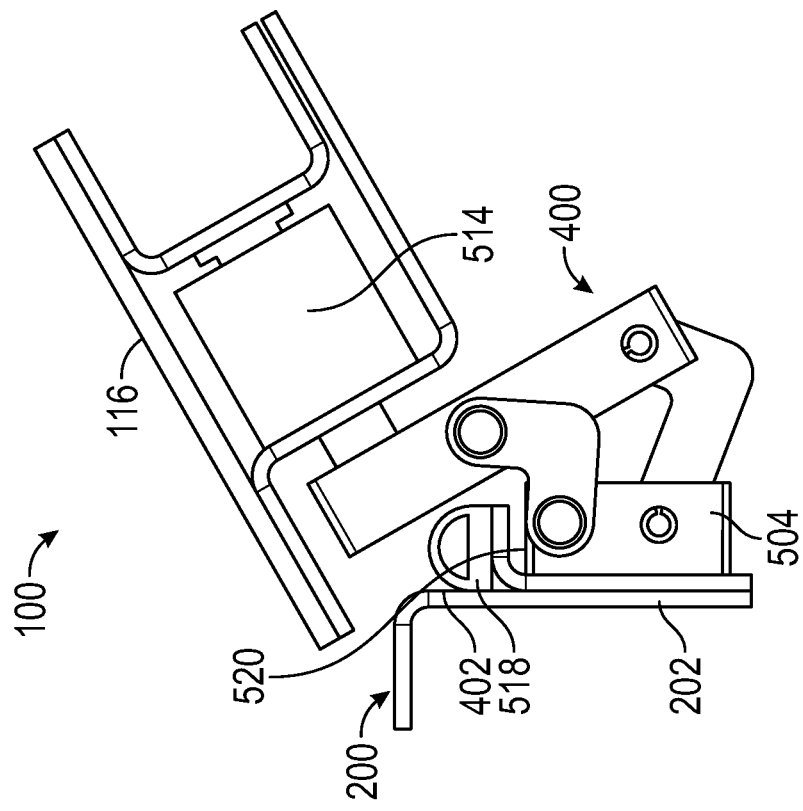
FIGS. 5A & 5B illustrate a hinge of the plurality of hinges in closed and open positions, in accordance with some embodiments of the present disclosure.
Figure 5A:
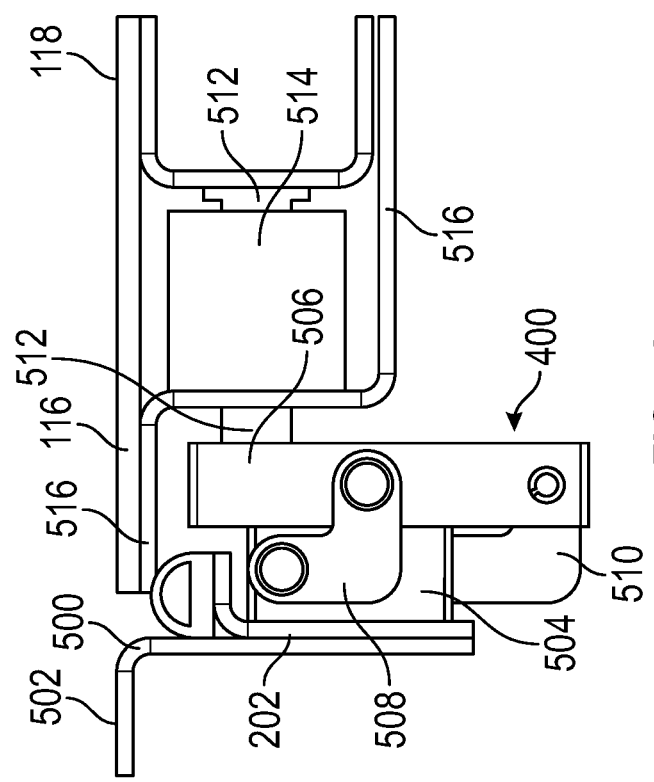

FIGS. 5A & 5B illustrate a hinge of the plurality of hinges in closed and open positions, in accordance with some embodiments of the present disclosure. Referring to FIG. 5A, the hinge 400 is secured to a corresponding rail 202 in a closed position. The hinge 400 may be secured to the rail 202 via structural adhesive tape. However, any suitable adhesive or fastener may be used to secure the hinge 400 to the rail 202. Moreover, the hinge 400 may be a four-bar hinge, a piano hinge, a simple hinge, or some combination thereof. For example, the hinge 400 may be a four-bar hinge such that the cover portion 116 may be lifted sufficiently to clear a top edge 500 of the rail 202 in an open position while still maintaining a top surface 118 of the cover portion aligned with a top surface 502 of the rail 202 in the closed position.

As illustrated, the hinge (e.g., a four-bar hinge) may have a mounting portion 504 and a pivoting portion 506 coupled together via at least one rotatable connector (e.g., a first rotatable connector 508 and a second rotatable connector 510). Further, the pivoting portion 506 may include a latch support bar 512 configured to interface with a corresponding latch 514 (e.g., a rotatory latch). In particular, the hinge 400 may be coupled to the cover portion 116 via the latch 514. Indeed, the cover portion 116 may be rigidly connected to the latch 514 either directly or indirectly. For example, as illustrated, the latch 514 may be indirectly secured to the cover portion 116. That is, the latch 514 may be mounted to a slide bar cover 516 and the cover portion 116 may be secured to the slide bar cover 516 such that the latch 514 is rigidly coupled to the cover portion 116 via the slide bar cover 516. Alternatively, the cover portion 116 may be mounted directly to the latch 514.

Moreover, as set forth in greater detail below, the latch 514 is configured to couple to the hinge 400 in a locked/coupled state of the latch 514 and decouple from the hinge 400 in an unlocked/decoupled state of the latch 514. Moreover, as the cover portion 116 may be rigidly secured to the latch 514, the latch 514 may be configured to couple the cover portion 116 to the hinge 400 in a locked state of the latch 514 and decouple the cover portion 116 from the hinge 400 in an unlocked state of the latch 514. Moreover, as illustrated, the latch 514 is in the locked state such that the cover portion 116 is coupled to the hinge 400. One of the actuators of the at least two actuators 106 (shown in FIG. 1) may be configured to actuate the latch 514 between the locked state and the unlocked state. For example, rotation of the left handle 110 (shown in FIG. 1) in either the clockwise or counterclockwise direction from a neutral state of the left handle 110 may actuate the latch 514 from the locked state to the unlocked state such that the cover portion 116, secured to the latch 514, may be detached/decoupled from the corresponding hinge 400.

FIG. 5B illustrates the hinge secured to a corresponding rail in an open position. As set forth above, with the latch 514 in the locked state, the cover portion 116 remains coupled to the hinge 400. As such, an upward force on the cover portion 116, via a user, may drive the hinge 400 to pivot such that the hinge 400 and the cover portion 116 may move to the open position. Similarly, a downward force on the cover portion 116 may drive the hinge 400 to pivot such that the hinge 400 and the cover portion 116 move to the closed position.

Moreover, the truck bed cover system 100 may include a gasket 518 disposed along an interface between the rail system 200 and the cover portion 116. As illustrated, the gasket 518 may be disposed proximate to an upper surface 520 of the mounting portion 504 of the hinge 400, the inner surface 402 of the corresponding rail 202, and the cover portion 116. However, the gasket 518 may be disposed in any suitable position on the truck bed cover system 100. The gasket 518 is configured to reduce entry of fluid and debris into the truck bed 102 (shown in FIG. 1) with the cover portion 116 in a closed position and/or the open position.

Figure 6:
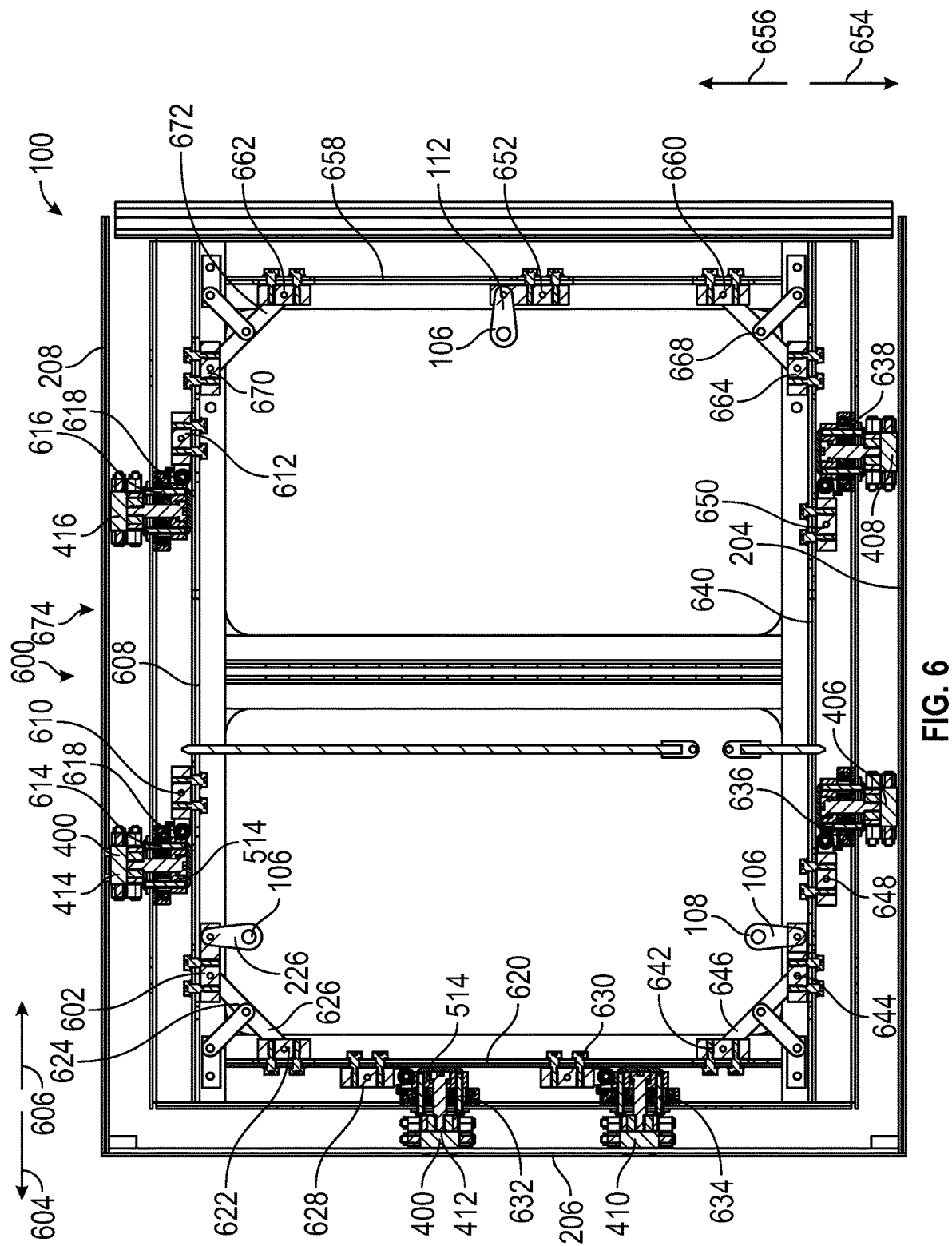
FIG. 6 illustrates a cross-sectional view of a latch system, in accordance with some embodiments of the present disclosure.

FIG. 6 illustrates a cross-sectional view of a latch system, in accordance with some embodiments of the present disclosure. The latch system 600 is configured to disconnect particular latches 514 (e.g., rotary latches) from their corresponding hinges 400 in response to actuation of a corresponding actuator 106 so that the truck bed cover system 100 may be opened from any side of the truck bed 102. As set forth above, the truck bed cover system 100 may include the rear actuator 112, the left actuator 108, and the right actuator 226. However, the truck bed cover system 100 may include any suitable number of actuators 106. Moreover, in the illustrated embodiment, the rear actuator 112, the left actuator 108, and the right actuator 226, are rotatable handles. However, any suitable type of actuator 106 may be used.

Actuating the right actuator 226, disposed on the right side 134 (e.g., passenger's side) of the cover portion 116 (shown in FIG. 3A), may disconnect the latches 514 coupled to the hinges 400 secured to the right rail 208 (e.g., the forward-right hinge 414 and the rear-right hinge 416) and the front rail 206 (e.g., the front-left hinge 410 and the front-right hinge 412) so that only the latches 514 coupled to the left rail 204 (e.g., the forward-left hinge 406 and the rear-left hinge 408) remain coupled and the cover portion 116 may open by hinging about the hinges 400 secured to the left rail 204. Specifically, actuating (e.g., rotating) the right actuator 226 is configured to drive a forward-right connection feature 602 in a forward direction 604 and/or a rearward direction 606. As the forward-right connection feature 602 is interfaced with a right slide bar 608, the right slide bar 608 may also slide forward and/or rearward in response to actuation of the right actuator 226. Movement of the right slide bar 608 may drive movement of a forward-right push block 610 and a rear-right push block 612. Movement of these push blocks 610, 612 is configured to trigger a forward-right latch 614 and a rear-right latch 616, respectively, to actuate from a locked position to an unlocked position. In the unlocked position, the forward-right latch 614 and a rear-right latch 616 may be decoupled/disconnected from a forward-right hinge 414 and a rear-right hinge 416, respectively.

In particular, the push blocks (e.g., the forward-right push block 610 and the rear-right push block 612) may interface with the latches 514 (e.g., the forward-right latch 614 and the rear-right latch 616) via respective coupling mechanisms 618. During operation, movement of the push blocks 610, 612 may drive rotation of the respective coupling mechanisms 618, and the respective coupling mechanisms 618 may trigger actuation of the latches 614, 616 to unlock. In the unlocked position, the latches 614, 616 may be disconnected from the corresponding hinges 414, 416.

Moreover, actuation of the right actuator 226 is also configured to drive movement of the front slide bar 620. In particular, the forward-right connection feature 602 is coupled to a front-right connection feature 622 via a linear motion linkage 624 (e.g., a front-right linear motion linkage 626). As the right actuator 226 drives the forward-right connection feature 602 forward and/or rearward, such movement pushes and/or pulls the front-right connection feature 622 via the front-right linear motion linkage 626, and movement of the front-right connection feature 622 drives movement of the front slide bar 620. Further, movement of the front slide bar 620 may drive movement of a front-right push block 628 and a front-left push block 630. Movement of these push blocks 628, 630 is configured to trigger a front-right latch 632 and a front-left latch 634, respectively, to actuate from a locked position to an unlocked position. In the unlocked position, the front-right latch 632 and a front-left latch 634 may be decoupled from a front-right hinge 412 and a front-left hinge 410, respectively.

As set forth above, with the latches 514 disconnected from the corresponding hinges 400 on the right rail 208 and the front rail 206, only the latches 514 (e.g., a forward-left latch 636 and a rear-left latch 638) coupled to the left rail 204 remain coupled such that the cover portion 116 may open by hinging/pivoting about the hinges 400 secured to the left rail 204. Also, actuating the right actuator 226 does not move a left slide bar 640. Indeed, movement of the front-right connection feature 622 moves the front slide bar 620 but does not move a front-left connection feature 642 for reasons set forth below. As the front-left connection feature 642 does not move, a forward-left connection feature 644 is not moved by a front-left linear motion linkage 646 and the left slide bar 640 remains stationary.

Moreover, actuating the left actuator 108, disposed on the left side 126 (e.g., the driver's side) of the cover portion 116 (shown in FIG. 3A), may disconnect the latches 514 coupled to the hinges 400 secured to the left rail 204 and the front rail 206 so that only the latches 514 (e.g., the forward-right latch 614 and the rear-right latch 616) coupled to the right rail 208 remain coupled and the cover portion 116 may open by hinging about the hinges 400 secured to the right rail 208. Specifically, actuating (e.g., rotating) the left actuator 108 is configured to drive a forward-left connection feature 644 in the forward direction 604 and/or the rearward direction 606. As the forward-left connection feature 644 is interfaced with a left slide bar 640, the left slide bar 640 may also slide forward and/or rearward in response to actuation of the left actuator 108. Movement of the left slide bar 640 may drive movement of a forward-left push block 648 and a rear-left push block 650. Movement of these push blocks 648, 650 is configured to trigger the forward-left latch 636 and the rear-left latch 638, respectively, to actuate from a locked position to an unlocked position. In the unlocked position, the forward-left latch 636 and a rear-left latch 638 may be decoupled/disconnected from a forward-left hinge 406 and a rear-left hinge 408, respectively.

Actuation of the left actuator 108 is also configured to drive movement of the front slide bar 620. In particular, the forward-left connection feature 644 is coupled to a front-left connection feature 642 via a linear motion linkage 624 (e.g., the front-left linear motion linkage 646). As the left actuator 108 drives the forward-left connection feature 644 forward and/or rearward, such movement pushes and/or pulls the front-left connection feature 642 via the front-left linear motion linkage 646, and movement of the front-left connection feature 642 drives movement of the front slide bar 620. Further, movement of the front slide bar 620 may drive movement of the front-right push block 628 and the front-left push block 630. Movement of these push blocks 628, 630 is configured to trigger the front-right latch 632 and the front-left latch 634, respectively, to actuate from the locked position to the unlocked position. As set forth above, in the unlocked position, the front-right latch 632 and the front-left latch 634 may be decoupled from the front-right hinge 412 and the front-left hinge 410, respectively.

As set forth above, with the latches 514 disconnected from the corresponding hinges 400 on the left rail 204 and the front rail 206, only the latches 514 (e.g., the forward-right latch 614 and the rear-right latch 616) coupled to the right rail 208 remain coupled such that the cover portion 116 may open by hinging about the hinges 400 secured to the right rail 208. Also, actuating the left actuator 108 does not move the right slide bar 608. Indeed, movement of the front-left connection feature 642 moves the front slide bar 620 but does not move the front-right connection feature 622 for reasons set forth below. As the front-right connection feature 622 does not move, the forward-right connection feature 602 is not moved by the front-right linear motion linkage 626 and the right slide bar 608 remains stationary.

Further, actuating the rear actuator 112, disposed on the rear side 130 of the cover portion 116 (shown in FIG. 3A), may disconnect the latches 514 coupled to the hinges 400 secured to the left rail 204 and the right rail 208 so that only the latches 514 coupled to the front rail 206 remain coupled and the cover portion 116 may open by hinging about the hinges 400 secured to the front rail 206. Specifically, actuating (e.g., rotating) the rear actuator 112 is configured to drive a back-middle connection feature 652 in a leftward direction 654 and/or a rightward direction 656. As the back-middle connection feature 652 is interfaced with a back slide bar 658, the back slide bar 658 may also slide leftward and/or rightward in response to actuation of the rear actuator 112. Movement of the back slide bar 658 may drive movement of a back-left connection feature 660 and a back-right connection feature 662. As such, the back-left connection feature 660 may drive movement of a rear-left connection feature 664, via a back left linear motion linkage 668, to drive movement of the left slide bar 640, and the back-right connection feature 662 may drive movement of a rear-right connection feature 670, via a rear-right linear motion linkage 672, to drive movement of the right slide bar 608. As set forth above, movement of the left slide bar 640 and the right slide bar 608 may disconnect the latches 514 from their corresponding hinges 400 secured to the left rail 204 and the right rail 208, respectively.

As set forth above, with the latches 514 disconnected from the corresponding hinges 400 on the left rail 204 and the right rail 208, only the latches 514 (e.g., the front-right latch 632 and the front-left latch 634) coupled to the front rail 206 remain coupled such that the cover portion 116 may open by hinging about the hinges 400 secured to the front rail 206. Also, actuating the rear actuator 112 does not move the front slide bar 620. Indeed, movement of the rear-left connection feature 664 and the rear-right connection feature 670 move the left slide bar 640 and the right slide bar 608, respectively, but do not move the forward-left connection feature 644 or the forward-right connection feature 602. As the forward-left connection feature 644 and the forward-right connection feature 602 do not move, neither the front-left connection feature 642 nor the front-right connection feature 622 are moved, and the front slide bar 620 remains stationary.

Moreover, an actuation assembly 674 of the present embodiment comprises the latch system 600 set forth above. However, any suitable actuation assembly 674 may be used to selectively disconnect the cover portion 116 from particular hinges 400 in response to actuation of a corresponding actuator 106 so that the truck bed cover system 100 may be opened from any side of the truck bed 102 (shown in FIG. 1). For example, in some embodiments, the actuation assembly 674 may include a cable actuated system having cables coupled to particular latches 514. That is, the left actuator 108, the right actuator 226, and the rear actuator 112 may be configured to pull on corresponding cables to release the particular latches 514.

Figure 7:
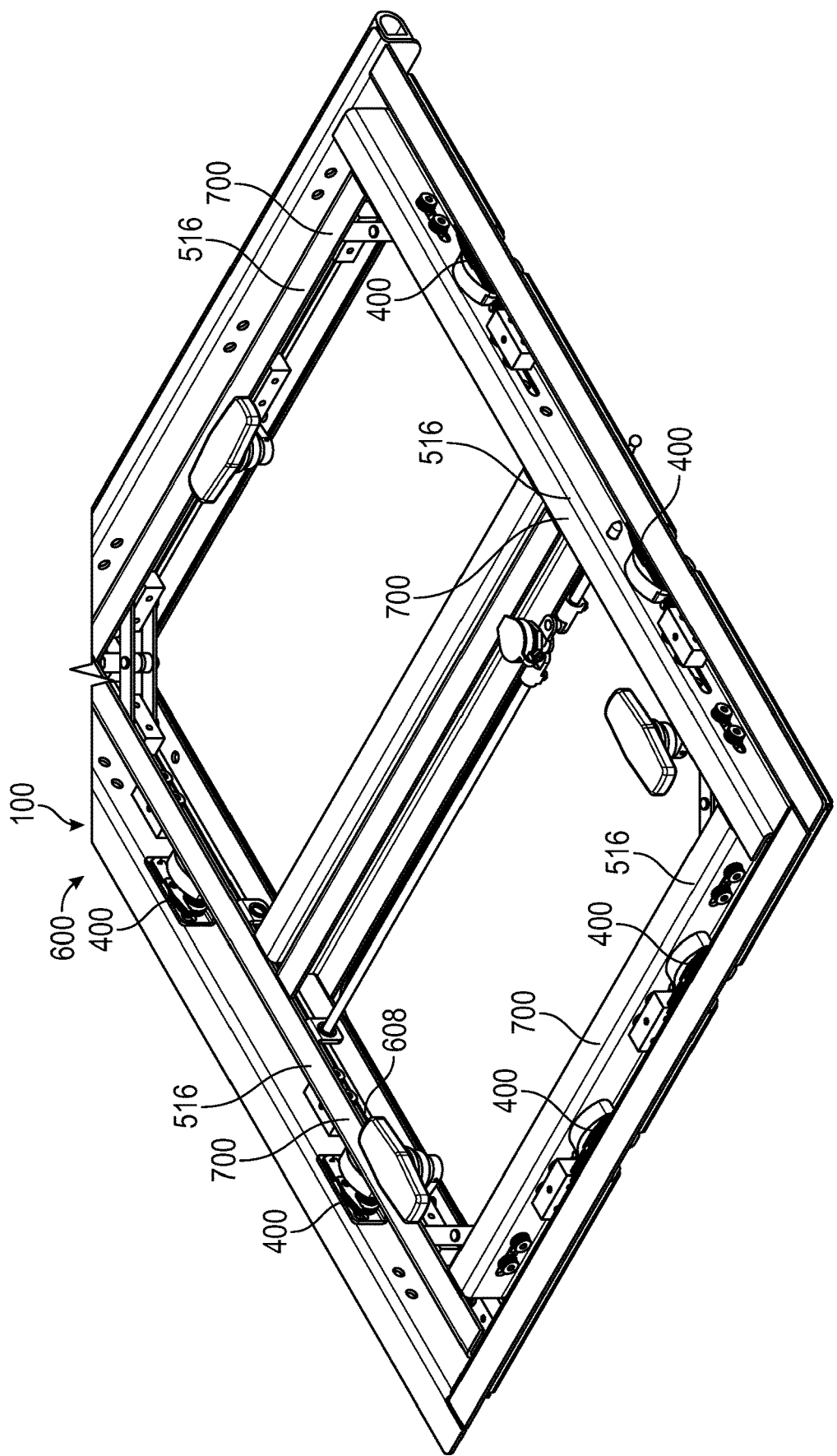
FIG. 7 illustrates an orthogonal view of a latch system with slide bar covers, in accordance with some embodiments of the present disclosure.

FIG. 7 illustrates an orthogonal view of a latch system with slide bar covers, in accordance with some embodiments of the present disclosure. As illustrated, the latch system 600 may include the plurality of slide bar covers 516. The slide bar covers 516 may provide structural support for the cover portion 116 (shown in FIG. 1). In particular, the bottom surface of the cover portion 116 may be secured to respective top surfaces 700 of the slide bar covers 516 in both the open position and the closed position of the truck bed cover system 100. That is, the slide bar covers 516 may move between the open position and the closed position with the respective hinges 400 and the cover portion 116.

Further, the slide bar covers 516 may reduce the risk of damage to components of the latch system 600 with the cover portion 116 in the open position. That is, the slide bar covers 516 may at least partially shield the slide bars (e.g., the front slide bar, the left slide bar, and the right slide bar 608) to prevent damage to the slide bars during use. For example, when retrieving cargo from the truck bed 102, the slide bar covers 516 may block incidental contact between the cargo and some components of the latch system 600 (e.g., the slide bars).

Figure 8:
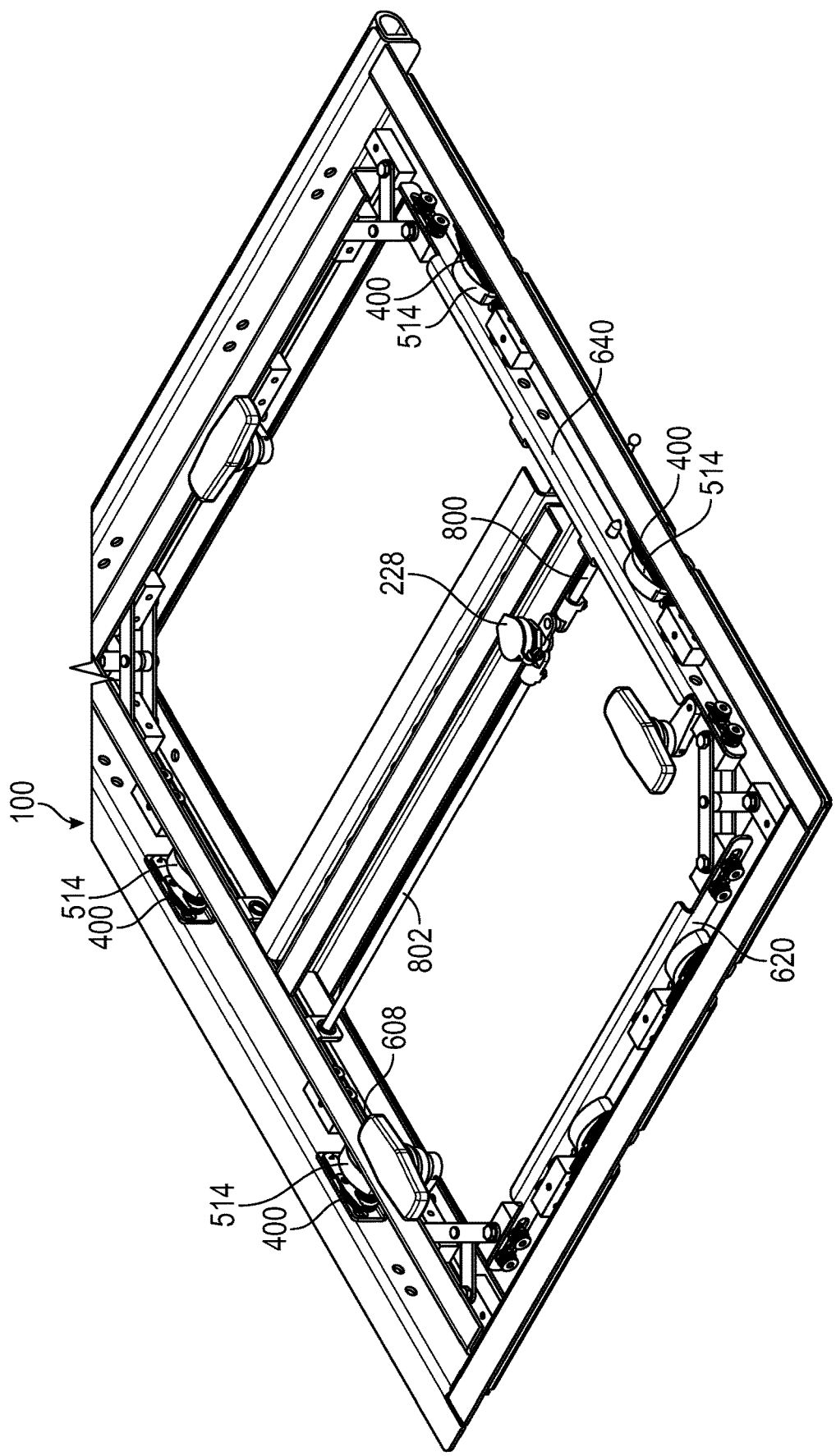
FIG. 8 illustrates an orthogonal view of the latch system, in accordance with some embodiments of the present disclosure.

FIG. 8 illustrates an orthogonal view of the latch system, in accordance with some embodiments of the present disclosure. As illustrated, the truck bed cover system 100 includes the locking mechanism 228. As illustrated, the locking mechanism 228 is configured to restrain movement of the left slide bar 640 and the right slide bar 608 in the locked position. As set forth above, movement of the left slide bar 640 is required to disconnect the latches 514 from the corresponding hinges 400 on the left rail 204, and movement of the right slide bar 608 is required to disconnect the latches 514 from the corresponding hinges 400 on the right rail 208 (shown in FIG. 6). Further, movement of at least one of the left slide bar 640 or the right slide bar 608 is required to move the front slide bar 620 for disconnecting the latches 514 from the corresponding hinges 400 on the front rail 206 (shown in FIG. 6). Accordingly, having the locking mechanism 228 restrain movement of the left slide bar 640 and the right slide bar 608 in the locked position effectively prevents opening of the truck bed cover system 100.

As illustrated, the locking mechanism 228 may include a left rod 800 for extending through the left slide bar 640 and a right rod 802 for extending through the right slide bar 608 in the locked position. Having the left rod 800 and the right rod 802 extend through the respective slide bars 640, 608 may restrain movement of the respective slide bars 640, 608 in the locked position. In some embodiments, the left rod 800 and the right rod 802 may additionally extend into the left rail 204 and right rail 208 (not shown), respectively, or into any other fixed portion of the truck bed cover system 100 to provide additional support for the rods 800, 802 to restrain movement of the respective slide bars 640, 608 in the locked position. Moreover, the locking mechanism 228 is configured to release the left slide bar 640 and the right slide bar 608 in the unlocked position by retracting the left rod 800 and the right rod 802 from the left slide bar 640 and the right slide bar 608, respectively. The locking mechanism 228 may be actuated between the locked position and the unlocked position with a key (not shown). However, the locking mechanism 228 may be actuated via any suitable system.

Figure 9:
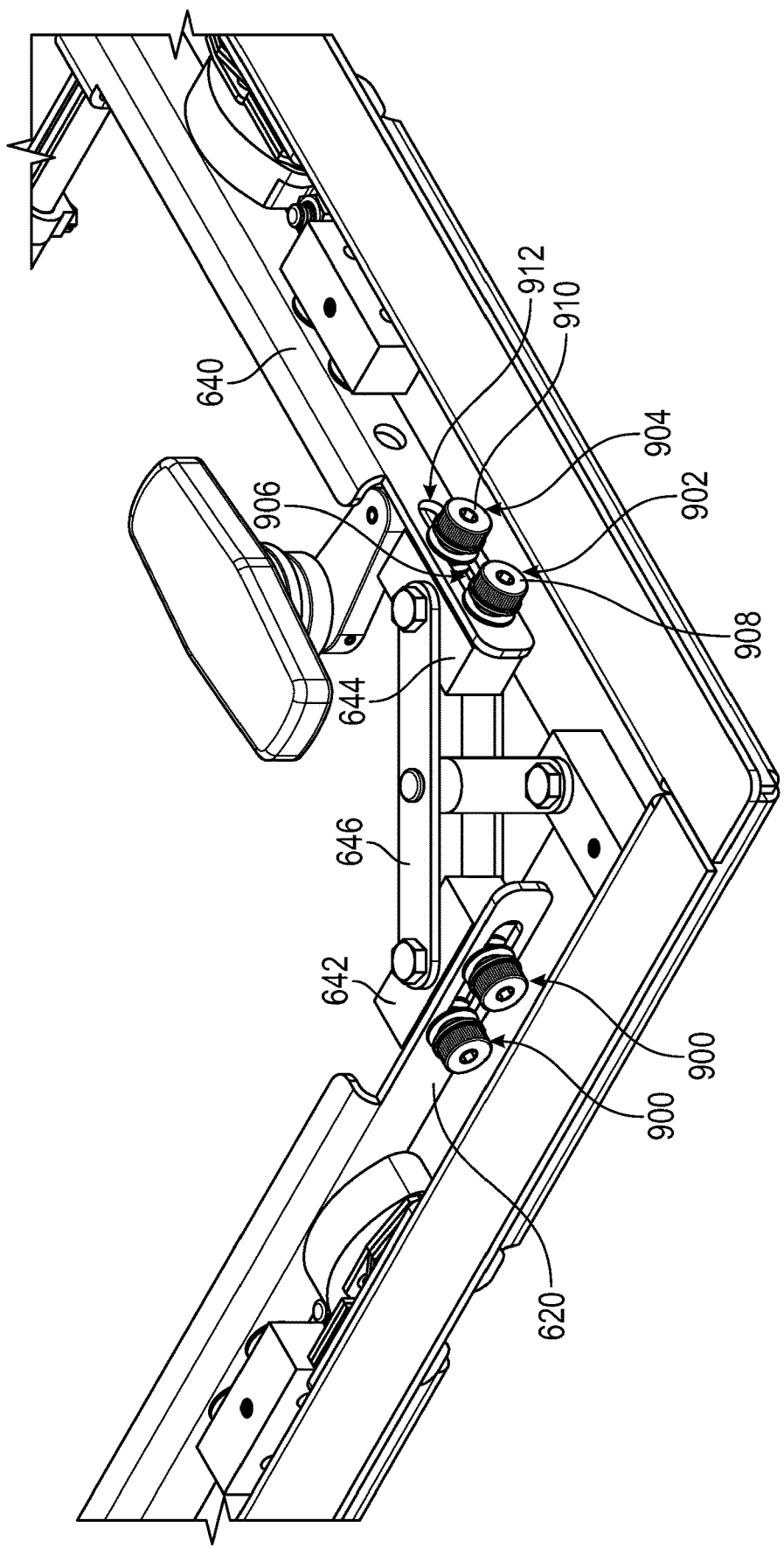
FIG. 9 illustrates an orthogonal view of a linear motion linkage of the latch system, in accordance with some embodiments of the present disclosure.

FIG. 9 illustrates an orthogonal view of a linear motion linkage of the latch system, in accordance with some embodiments of the present disclosure. As illustrated, the forward-left connection feature 644 and the front-left connection feature 642 are coupled to each other via the front-left linear motion linkage 646. The connection features 644, 642 may have rectangular block shapes. However, the connection features 644, 642 may have any suitable shape. Further, the connection features 644, 642 may be coupled to their respective slide bars (e.g., the left slide bar 640 and the front slide bar 620) via a plurality of bolts 900 or any other suitable fasteners. For example, the forward-left connection feature 644 comprises two bolts (e.g., a first bolt 902 and a second bolt 904) spaced along a length of the forward-left connection feature 644. The bolts 902, 904 extend through a slot 906 in the left slide bar 640 with heads (e.g., a first head 908 and a second head 910) of the bolts 902, 904 disposed opposite the forward-left connection feature 644 such that the bolts 902, 904 secure the forward-left connection feature 644 to the left slide bar 640.

However, the bolts 902, 904 may not be configured to compress or clamp the left slide bar 640 against the forward-left connection feature 644. Instead, the bolts 902, 904 may comprise respective shoulders that prevent clamping. Specifically, with the bolts 902, 904 inserted into the forward-left connection feature 644, the shoulders provide respective gaps between the corresponding heads 908, 910 of the bolts 902, 904 and the forward-left connection feature 644 such that respective shafts of the bolts 902, 904 may slide along the slot 906; thereby, permitting movement of the left slide bar 640 with respect to the forward-left connection feature 644. As such, movement of the left slide bar 640 may not drive movement of the forward-left connection feature 644. However, movement of the forward-left connection feature 644 may cause the first bolt 902 or the second bolt 904 to contact an end 912 of the slot 906. Further, movement of the forward-left connection feature 644 (i.e., after contacting the end 912 of the slot) may cause the forward-left connection feature 644 to drive the left slide bar 640 to move via the contact between the first bolt 902 or the second bolt 904 and the end 912 of the slot 906.

Figure 10:
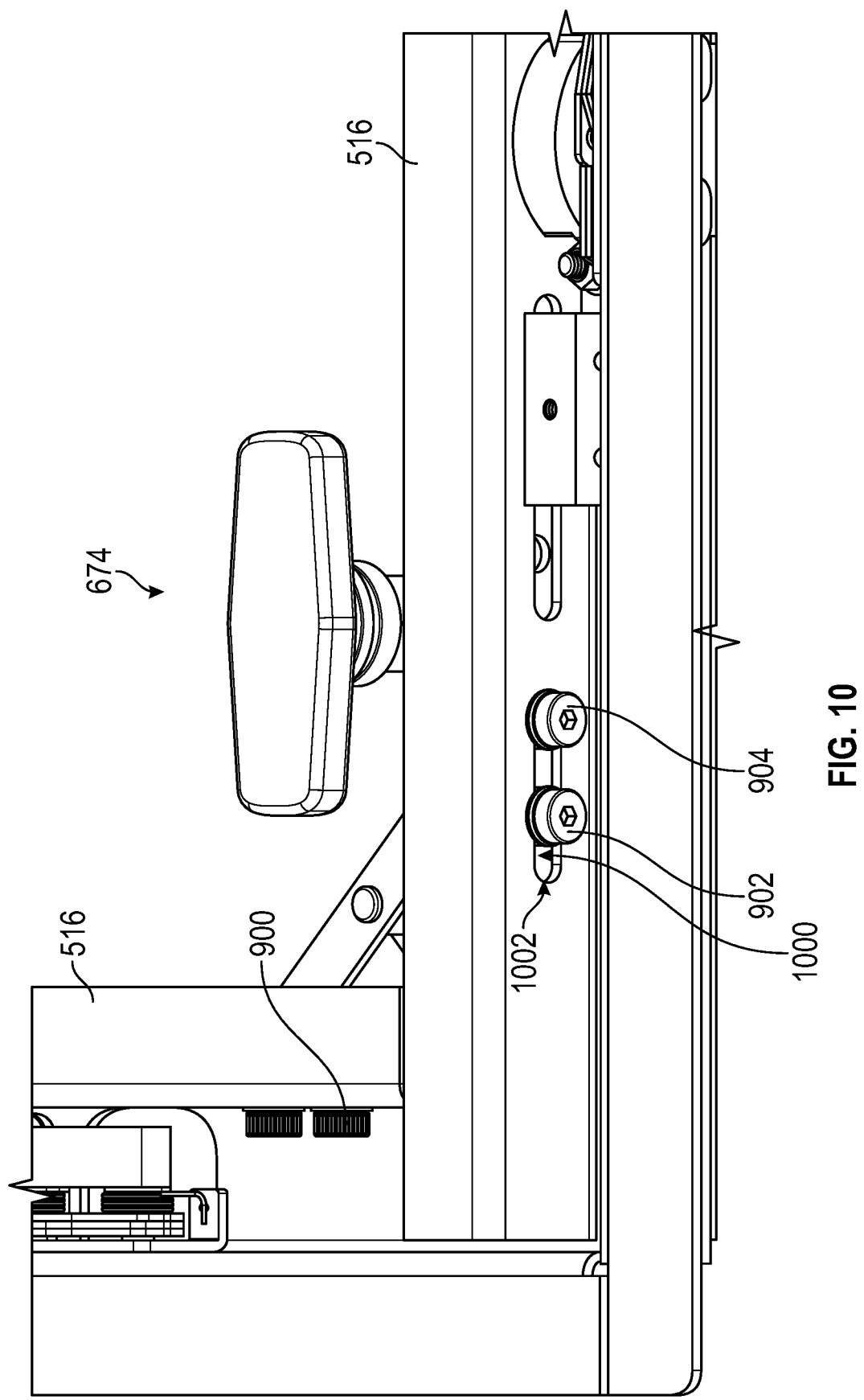
FIG. 10 illustrates an orthogonal view of a linear motion linkage of the latch system with the slide bar covers, in accordance with some embodiments of the present disclosure.

FIG. 10 illustrates an orthogonal view of a linear motion linkage of the latch system with the slide bar covers, in accordance with some embodiments of the present disclosure. As illustrated, the slide bars may be disposed in respective slide bar covers 516 such that the slide bar covers 516 may protect the slide bars and/or other portions of the actuation assembly 674 from cargo disposed in the truck bed 102. Further, the slide bar covers 516 may include cover slots 1000 such that corresponding bolts 900 (e.g., the first bolt 902 and the second bolt 904) may slide along the slide bar covers 516 as well. Further, the cover slots 1000 may be configured to restrain movement of the slide bar. That is, contact between the bolts 900 and respective ends 1002 of the cover slot 906 may restrain movement of the slide bar.

Accordingly, the present disclosure may provide a truck bed cover system with a cover portion that may be opened from multiple sides of a vehicle. The systems may include any of the various features disclosed herein, including one or more of the following statements.

Statement 1. A truck bed cover system, comprising: a plurality of hinges having at least one first hinge securable proximate a first side of a truck bed and at least one second hinge securable proximate a second side of the truck bed; a plurality of latches having at least one first latch couplable to the at least one first hinge and at least one second latch couplable to the at least one second hinge; a cover portion secured to each latch of the plurality of latches; and an actuation assembly having a first actuator configured to actuate the at least one first latch between a coupled and decoupled state and a second actuator configured to actuate the at least one second latch between a coupled and decoupled state, wherein the cover portion is configured to hinge about the at least one first hinge in response to the at least one second latch decoupling from the at least one second hinge, and wherein the cover portion is configured to hinge about the at least one second hinge in response to the at least one first latch decoupling from the at least one first hinge.

Statement 2. The truck bed cover system of statement 1, further comprising a rail system having a plurality of rails each configured to mount to a corresponding side of the truck bed, and wherein the at least one first hinge and the at least one second hinge are each secured to corresponding rails of the plurality of rails.

Statement 3. The truck bed cover system of statement 1, wherein the at least one first hinge is securable directly to the first side of the truck bed, and wherein the at least one second hinge is securable directly to the second side of the truck bed.

Statement 4. The truck bed cover system of any preceding statement, further comprising at least one third hinge securable proximate a third side of the truck bed, and wherein the first side of the truck bed is on a passenger's side of the truck bed, wherein the second side of the truck bed is proximate a cab of the truck, and wherein the third side of the truck bed is on a driver's side of the truck bed.

Statement 5. The truck bed cover system of any preceding statement, wherein the first actuator is disposed proximate a third side of the truck bed, wherein the third side of the truck bed is disposed opposite the first side of the truck bed, and wherein the second actuator is disposed proximate a fourth side of the truck bed, wherein the fourth side of the truck bed is disposed opposite the second side of the truck bed.

Statement 6. The truck bed cover system of any preceding statement, wherein the first actuator and the second actuator each comprise respective handles mounted to a top of the cover portion, wherein the respective handles are configured to rotate to actuate their corresponding latches between the coupled and decoupled states.

Statement 7. The truck bed cover system of any preceding statement, wherein clockwise and counterclockwise rotation of the first handle away from a neutral position is configured to actuate the at least one first latch to the decoupled state, and wherein clockwise and counterclockwise rotation of the second handle away from a neutral position is configured to actuate the at least one second latch to the decoupled state.

Statement 8. The truck bed cover system of any preceding statement, wherein the actuation assembly comprises a cable actuated system having cables coupled to each latch of the plurality of latches, and wherein the left actuator, the right actuator, and the rear actuator are configured to pull on corresponding cables to decouple the corresponding latches.

Statement 9. The truck bed cover system of any preceding statement, wherein the cover portion comprises a polyurea coating, a powder coating, a paint coating, an anodic oxide finish, or some combination thereof.

Statement 10. The truck bed cover system of any preceding statement, wherein the plurality of hinges comprises four-bar hinges, piano hinges, simple hinges, or some combination thereof.

Statement 11. The truck bed cover system of any preceding statement, further comprising at least one spring configured to support the cover portion in an open position.

Statement 12. The truck bed cover system of any preceding statement, wherein the at least one spring comprises a first spring, a second spring, a third spring, and a fourth spring each configured to support the cover portion, wherein the first spring is secured to a left rail of a rail system, the second spring is secured to a right rail of the rail system, and the third spring and the fourth spring are secured to a front rail of the rail system, and wherein each rail of the rail system is configured to mount to a corresponding side of the truck bed.

Statement 13. The truck bed cover system of any preceding statement, wherein the at least one spring comprises a compression spring, a tension string, a torsion spring, gas spring or some combination thereof.

Statement 14. A truck bed cover system, comprising: a rail system configured to mount to a truck bed, the rail system comprising a front rail, a left rail secured to a left end of the front rail, and a right rail secured to a right end of the front rail; a plurality of hinges secured to the rail system, wherein at least two hinges of the plurality of hinges are secured to each of the front rail, the left rail, and the right rail; a plurality of rotary latches, wherein each rotary latch of the plurality of rotary latches is secured to a corresponding hinge of the plurality of hinges; a cover portion secured to each rotary latch of the plurality of rotary latches; and an actuation assembly having a left actuator disposed proximate the left rail, a right actuator disposed proximate the right rail, and a rear actuator disposed opposite the front rail, wherein actuating the left actuator is configured to detach the rotary latches from the corresponding hinges secured to the left rail and the front rail such that the cover portion may be hinged about the right rail, wherein actuating the right actuator is configured to detach the rotary latches from the corresponding hinges secured to the right rail and the front rail such that the cover portion may be hinged about the left rail, and wherein actuating the rear actuator is configured to detach the rotary latches from the corresponding hinges secured to the left rail and the right rail such that the cover portion may be hinged about the front rail.

Statement 15. The truck bed cover system of statement 14, wherein the actuation assembly comprises: a plurality of slide bars supported via a slide bar frame, the plurality of slide bars having a left slide bar disposed proximate the left rail, a front slide bar disposed proximate the front rail, and a right slide bar disposed proximate the right rail; a plurality of push blocks secured to respective slide bars of the plurality of slide bars, wherein each push block is configured to drive a corresponding rotary latch to unlock the rotary latch in response to movement of the respective slide bar; a plurality of connector features secured to respective slide bars, wherein left actuator, the right actuator, and the rear actuator are each coupled to a corresponding connector feature to drive movement of the slide bar in response to actuation of a respective actuator; and linear motion linkages configured to couple a first connector feature with a corresponding second connector feature secured to an adjacent slide bar, wherein the liner motion linkage is configured to drive movement of the second connector feature in response to movement of the first connector feature such that movement of a first slide bar drives movement of a second slide bar.

Statement 16. The truck bed cover system of statement 14 or statement 15, further comprising a locking mechanism configured to restrain movement of the left slide bar and the right slide bar in the locked position, and wherein the locking mechanism is configured to release the left and right slide bar in the unlocked position.

Statement 17. The truck bed cover system of any of statements claim 14-16, further comprising a gasket disposed along an interface between the rail system of the cover portion, wherein the gasket is configured to reduce entry of fluid and debris into the truck bed with the cover portion in a closed position.

Statement 18. The truck bed cover system of any of statements claim 14-17, further comprising a plurality of slide bar covers configured to shield the plurality of slide bars from cargo disposed in the truck bed.

Statement 19. The truck bed cover system of any of statements claim 14-18, wherein each rotary latch of the plurality of rotary latches is secured to a corresponding slide bar cover of the plurality of slide bar covers, and wherein the cover portion is secured to each slide bar cover of the plurality of slide bar covers such that the cover portion is secured to each rotary latch of the plurality of rotary latches via the plurality of slide bar covers.

Statement 20. A truck bed cover system, comprising: a rail system configured to mount to a truck bed, the rail system comprising a front rail, a left rail secured to a left end of the front rail, and a right rail secured to a right end of the front rail; a plurality of hinges secured to the rail system, wherein at least two hinges of the plurality of hinges are secured to each of the front rail, the left rail, and the right rail; a plurality of rotary latches, wherein each rotary latch of the plurality of rotary latches is secured to a corresponding hinge of the plurality of hinges; a cover portion secured to each rotary latch of the plurality of rotary latches; and a left actuator disposed proximate the left rail, wherein actuating the left actuator is configured to detach the rotary latches from the corresponding hinges secured to the left rail and the front rail such that the cover portion may be hinged about the right rail; a right actuator disposed proximate the right rail, wherein actuating the right actuator is configured to detach the rotary latches from the corresponding hinges secured to the right rail and the front rail such that the cover portion may be hinged about the left rail; a rear actuator disposed opposite the front rail, wherein actuating the rear actuator is configured to detach the rotary latches from the corresponding hinges secured to the left rail and the right rail such that the cover portion may be hinged about the front rail; a plurality of slide bars supported via a slide bar frame, the plurality of slide bars having a left slide bar disposed proximate the left rail, a front slide bar disposed proximate the front rail, and a right slide bar disposed proximate the right rail; a plurality of push blocks secured to respective slide bars of the plurality of slide bars, wherein each push block is configured to contact a corresponding rotary latch to unlock the rotary latch in response to movement of the respective slide bar; a plurality of connector features secured to respective slide bars, wherein left actuator, the right actuator, and the rear actuator are each coupled to a corresponding connector feature to drive movement of the slide bar in response to actuation of a respective actuator; and linear motion linkages configured to couple a first connector feature with a corresponding second connector feature secured to an adjacent slide bar, wherein the liner motion linkage is configured to drive movement of the second connector feature in response to move of the first connector feature such that movement of a first slide bar drives movement of a second slide bar.

Moreover, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A truck bed cover system, comprising:
   a plurality of hinges having at least one first hinge securable proximate a first side of a truck bed and at least one second hinge securable proximate a second side of the truck bed;
   a plurality of latches having at least one first latch couplable to the at least one first hinge and at least one second latch couplable to the at least one second hinge;
   a cover portion secured to each latch of the plurality of latches; and
   an actuation assembly having a first actuator configured to actuate the at least one first latch between a coupled and decoupled state and a second actuator configured to actuate the at least one second latch between a coupled and decoupled state, wherein the cover portion is configured to hinge about the at least one first hinge in response to the at least one second latch decoupling from the at least one second hinge, and wherein the cover portion is configured to hinge about the at least one second hinge in response to the at least one first latch decoupling from the at least one first hinge.

2. The truck bed cover system of claim 1, further comprising a rail system having a plurality of rails each configured to mount to a corresponding side of the truck bed, and wherein the at least one first hinge and the at least one second hinge are each secured to corresponding rails of the plurality of rails.

3. The truck bed cover system of claim 1, wherein the at least one first hinge is securable directly to the first side of the truck bed, and wherein the at least one second hinge is securable directly to the second side of the truck bed.

4. The truck bed cover system of claim 1, further comprising at least one third hinge securable proximate a third side of the truck bed, and wherein the first side of the truck bed is on a passenger's side of the truck bed, wherein the second side of the truck bed is proximate a cab of the truck, and wherein the third side of the truck bed is on a driver's side of the truck bed.

5. The truck bed cover system of claim 1, wherein the first actuator is disposed proximate a third side of the truck bed, wherein the third side of the truck bed is disposed opposite the first side of the truck bed, and wherein the second actuator is disposed proximate a fourth side of the truck bed, wherein the fourth side of the truck bed is disposed opposite the second side of the truck bed.

6. The truck bed cover system of claim 1, wherein the first actuator and the second actuator each comprise respective handles mounted to a top of the cover portion, wherein the respective handles are configured to rotate to actuate their corresponding latches between the coupled and decoupled states.

7. The truck bed cover system of claim 6, wherein clockwise and counterclockwise rotation of the first handle away from a neutral position is configured to actuate the at least one first latch to the decoupled state, and wherein clockwise and counterclockwise rotation of the second handle away from a neutral position is configured to actuate the at least one second latch to the decoupled state.

8. The truck bed cover system of claim 1, wherein the actuation assembly comprises a cable actuated system having cables coupled to each latch of the plurality of latches, and wherein the first actuator and the second actuator are configured to pull on corresponding cables to decouple the corresponding latches.

9. The truck bed cover system of claim 1, wherein the cover portion comprises a polyurea coating, a powder coating, a paint coating, an anodic oxide finish, or some combination thereof.

10. The truck bed cover system of claim 1, wherein the plurality of hinges comprises four-bar hinges, piano hinges, simple hinges, or some combination thereof.

11. The truck bed cover system of claim 1, further comprising at least one spring configured to support the cover portion in an open position.

12. The truck bed cover system of claim 11, wherein the at least one spring comprises a first spring, a second spring, a third spring, and a fourth spring each configured to support the cover portion, wherein the first spring is secured to a left rail of a rail system, the second spring is secured to a right rail of the rail system, and the third spring and the fourth spring are secured to a front rail of the rail system, and wherein each rail of the rail system is configured to mount to a corresponding side of the truck bed.

13. The truck bed cover system of claim 11, wherein the at least one spring comprises a compression spring, a tension string, a torsion spring, gas spring or some combination thereof.

14. A truck bed cover system, comprising:
   a rail system configured to mount to a truck bed, the rail system comprising a front rail, a left rail secured to a left end of the front rail, and a right rail secured to a right end of the front rail;
   a plurality of hinges secured to the rail system, wherein at least two hinges of the plurality of hinges are secured to each of the front rail, the left rail, and the right rail;
   a plurality of rotary latches, wherein each rotary latch of the plurality of rotary latches is secured to a corresponding hinge of the plurality of hinges;
   a cover portion secured to each rotary latch of the plurality of rotary latches; and
   an actuation assembly having a left actuator disposed proximate the left rail, a right actuator disposed proximate the right rail, and a rear actuator disposed opposite the front rail, wherein actuating the left actuator is configured to detach the rotary latches from the corresponding hinges secured to the left rail and the front rail such that the cover portion may be hinged about the right rail, wherein actuating the right actuator is configured to detach the rotary latches from the corresponding hinges secured to the right rail and the front rail such that the cover portion may be hinged about the left rail, and wherein actuating the rear actuator is configured to detach the rotary latches from the corresponding hinges secured to the left rail and the right rail such that the cover portion may be hinged about the front rail.

15. The truck bed cover system of claim 14, wherein the actuation assembly comprises:
a plurality of slide bars supported via a slide bar frame, the plurality of slide bars having a left slide bar disposed proximate the left rail, a front slide bar disposed proximate the front rail, and a right slide bar disposed proximate the right rail;
a plurality of push blocks secured to respective slide bars of the plurality of slide bars, wherein each push block is configured to drive a corresponding rotary latch to unlock the rotary latch in response to movement of the respective slide bar;
a plurality of connector features secured to respective slide bars, wherein left actuator, the right actuator, and the rear actuator are each coupled to a corresponding connector feature to drive movement of the slide bar in response to actuation of a respective actuator; and
a linear motion linkage configured to couple a first connector feature with a corresponding second connector feature secured to an adjacent slide bar, wherein the liner motion linkage is configured to drive movement of the second connector feature in response to movement of the first connector feature such that movement of a first slide bar drives movement of a second slide bar.

16. The truck bed cover system of claim 15, further comprising a locking mechanism configured to restrain movement of the left slide bar and the right slide bar in a locked position, and wherein the locking mechanism is configured to release the left slide bar and the right slide bar in an unlocked position.

17. The truck bed cover system of claim 14, further comprising a gasket disposed along an interface between the rail system of the cover portion, wherein the gasket is configured to reduce entry of fluid and debris into the truck bed with the cover portion in a closed position.

18. The truck bed cover system of claim 14, further comprising a plurality of slide bar covers configured to shield the plurality of slide bars from cargo disposed in the truck bed.

19. The truck bed cover system of claim 18, wherein each rotary latch of the plurality of rotary latches is secured to a corresponding slide bar cover of the plurality of slide bar covers, and wherein the cover portion is secured to each slide bar cover of the plurality of slide bar covers such that the cover portion is secured to each rotatory latch of the plurality of rotary latches via the plurality of slide bar covers.

20. A truck bed cover system, comprising:
a rail system configured to mount to a truck bed, the rail system comprising a front rail, a left rail secured to a left end of the front rail, and a right rail secured to a right end of the front rail;
a plurality of hinges secured to the rail system, wherein at least two hinges of the plurality of hinges are secured to each of the front rail, the left rail, and the right rail;
a plurality of rotary latches, wherein each rotary latch of the plurality of rotary latches is secured to a corresponding hinge of the plurality of hinges;
a cover portion secured to each rotary latch of the plurality of rotary latches; and
a left actuator disposed proximate the left rail, wherein actuating the left actuator is configured to detach the rotary latches from the corresponding hinges secured to the left rail and the front rail such that the cover portion may be hinged about the right rail;
a right actuator disposed proximate the right rail, wherein actuating the right actuator is configured to detach the rotary latches from the corresponding hinges secured to the right rail and the front rail such that the cover portion may be hinged about the left rail;
a rear actuator disposed opposite the front rail, wherein actuating the rear actuator is configured to detach the rotary latches from the corresponding hinges secured to the left rail and the right rail such that the cover portion may be hinged about the front rail;
a plurality of slide bars supported via a slide bar frame, the plurality of slide bars having a left slide bar disposed proximate the left rail, a front slide bar disposed proximate the front rail, and a right slide bar disposed proximate the right rail;
a plurality of push blocks secured to respective slide bars of the plurality of slide bars, wherein each push block is configured to contact a corresponding rotary latch to unlock the rotary latch in response to movement of the respective slide bar;
a plurality of connector features secured to respective slide bars, wherein left actuator, the right actuator, and the rear actuator are each coupled to a corresponding connector feature to drive movement of the slide bar in response to actuation of a respective actuator; and
a linear motion linkage configured to couple a first connector feature with a corresponding second connector feature secured to an adjacent slide bar, wherein the liner motion linkage is configured to drive movement of the second connector feature in response to move of the first connector feature such that movement of a first slide bar drives movement of a second slide bar.

* * * * *